Dec. 10, 1968  JEAN-LOUIS GABRIEL MACK  3,416,085
GALVANOMETER SUSPENSION ASSEMBLY HAVING A
SIMPLIFIED CENTER OF GRAVITY, BUOYANCY
AND CENTERLINE ADJUSTMENT
Filed June 29, 1964
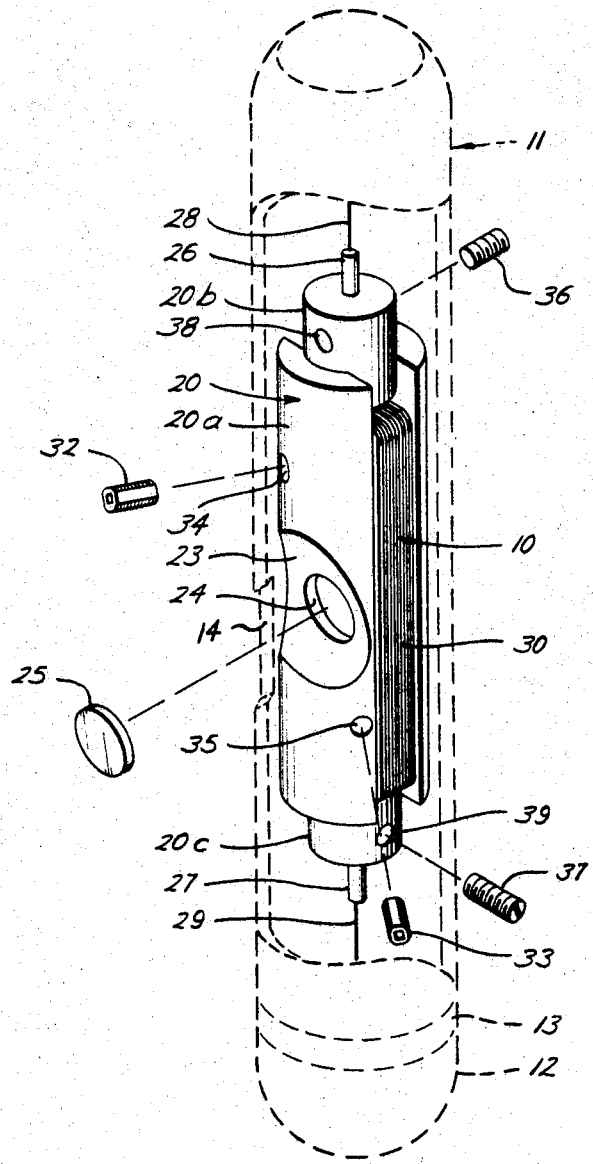
Jean-Louis Gabriel Mack
INVENTOR.
BY Richard E. Bee
ATTORNEY United States Patent Office 3,416,085
Patented Dec. 10, 1968

3,416,085
GALVANOMETER SUSPENSION ASSEMBLY HAVING A SIMPLIFIED CENTER OF GRAVITY, BUOYANCY AND CENTERLINE ADJUSTMENT
Jean-Louis Gabriel Mack, Bourg-la-Reine, France, assignor to Societe de Prospection Electrique Schlumberger, S.A., Paris, France, a corporation of France
Filed June 29, 1964, Ser. No. 378,770
Claims priority, application France, July 3, 1963, 940,182
6 Claims. (Cl. 324—154)

ABSTRACT OF THE DISCLOSURE

One embodiment of the invention provides two pairs of adjustable screws seated in a rotatable galvanometer body member to enable the centers of gravity and buoyancy to be aligned with the body centerline. The density of one set of screws is greater than the average density of the immersing fluid. These screws are adjusted to align the centers of buoyancy and gravity. The density of the other pair of screws is equal to the immersing fluid as well as the density of the body and enables the centers of buoyancy and gravity to be aligned with the body centerline.

---

This invention relates to galvanometer suspension assemblies and, particularly, to such assemblies of the kind used in liquid-filled mirror-type galvanometers.

It is frequently desirable to have a mirror-type galvanometer which is relatively insensitive to external vibrations and shocks. This purpose can be accomplished by suspending the galvanometer suspension assembly in a liquid-filled housing wherein the density of the liquid which fills the housing is equal to the average density of the suspension assembly. Further improvement is obtained by constructing the suspension assembly so that the center of gravity of the suspension assembly and the center of buoyancy of the suspension assembly coincide with one another and so that both are located on the axis of rotation of the suspension assembly. Galvanometers incorporating one or more of these features are described in U.S. Patent No. 2,623,083, granted to Schlumberger and Picard on Dec. 23, 1952, U.S. Patent No. 2,623,084, granted to Schlumberger, Picard and Barreteau on Dec. 23, 1952, and in co-pending U.S. application Ser. No. 108,381, filed in the name of Picard on May 8, 1961, and issued on Dec. 15, 1964 as U.S. Patent No. 3,161,826.

While these prior galvanometers have been found to provide substantial improvements over earlier types of galvanometers, it has been found that the initial adjustment or balancing of the galvanometer movements is a rather tedious and time-consuming process. The different balance adjustments are interdependent on one another and a large number of successive adjustments and readjustments are usually required before all the desired conditions are realized.

It is an object of the invention, therefore, to provide a new and improved suspension assembly for a liquid-filled galvanometer which may be balanced in a more rapid and efficient manner.

In accordance with the invention, there is provided in a galvanometer having a liquid-filled housing and a suspension assembly suspended for rotation therein, an improved suspension assembly comprising an elongated body member and a coil winding mounted on the body member. The improved suspension assembly further comprises first balancing means adjustably mounted in the body member and having a density at least twice as great as the density of the liquid for aligning the center of gravity of the suspension assembly with the center of buoyancy of the suspension assembly. The improved suspension assembly further includes second balancing means adjustably mounted in the body member and having a density approximately equal to the density of the liquid for simultaneously aligning both the center of gravity and the center of buoyancy of the suspension assembly with the axis of rotation of the suspension assembly.

For a better understanding of the present invention, together with other and further objects thereof, reference is had to the following description taken in connection with the accompanying drawing, the scope of the invention being pointed out in the appended claims.

The single figure of the drawing shows a partially exploded perspective view of a representative embodiment of a galvanometer suspension assembly constructed in accordance with the present invention.

Referring to the drawing, there is shown a galvanometer suspension assembly 10 suspended for rotation within a fluid-tight metal galvanometer housing 11. The housing 11 is indicated in outline form in order to show the suspension assembly in an exploded manner. After assembly, the housing 11 is filled with an electrically nonconductive liquid having the appropriate density or specific gravity. A suitable liquid for the present embodiment is perchloroethylene having a density of approximately 1.6 grams per cubic centimeter. A metal closure member 12 at the lower end of the housing 11 is electrically insulated from the remainder of the housing by means of an intermediate member 13 of nonconductive material. In this manner, the closure member 12 may serve as one electrical terminal, while the upper portion of the housing may serve as the other electrical terminal for the galvanometer. A window 14 is provided in the housing 11 on one side of the mid-portion thereof. After assembly, a suitable piece of optical glass (not shown) is positioned in the window 14 in sealing engagement with the edges thereof to maintain the fluid-tight status of the housing 11. In use, the housing 11 is adapted to be placed between the poles of an external permanent magnet. Consequently, the wall of housing 11 may include cooperating pole piece members composed of magnetic material.

The suspension assembly 10 includes an elongated generally cylindrical and symmetrical body member 20 constructed of a plastic material having a density somewhat less than the density of the liquid used to fill the housing 11. A suitable plastic material for the present embodiment is epoxy resin having a density of approximately 1.1 grams per cubic centimeter. The body member 20 includes a middle bobbin portion 20a intermediate a pair of like cylindrical end pieces 20b and 20c. In the present embodiment, the bobbin portion 20a and end pieces 20b and 20c are machined from cylindrical blanks of epoxy resin. End pieces 20b and 20c are set and glued in cooperating cylindrical recesses formed in the ends of the bobbin portion 20a. The middle section of the bobbin portion 20a is machined on opposite sides to provide a pair of concave recesses 23, only one of which is visible in the drawing. A cylindrical passageway 24 is provided through the bobbin portion 20a at the bottom of these recesses. A circular mirror 25 is glued in the passageway 24. Recesses 23 and passageway 24 are symmetrically located with respect to the center of bobbin portion 20a.

Terminal means in the form of a pair of small metal tubes or hollow rods 26 and 27 are inserted in and secured to mating passageways which extend axially into the ends of the end pieces 20b and 20c. The suspension assembly 10 is suspended within the housing 11 by means of a pair of suspension wires 28 and 29 which are welded to the ends of the terminal pieces 26 and 27 and secured to the extremities of the housing 11 in an appropriate manner.

A coil winding 30 is wound on the bobbin portion 20a of the body member 20. This coil winding 30 is composed of many turns of an insulated conductor wire such as copper. One lead to the coil winding 30 is welded to the upper terminal piece 26, while the other lead is welded to the lower terminal piece 27.

The suspension assembly 10 further includes first balancing means adjustably mounted in the body member 20 and having a density several times greater than the density of the liquid contained in the galvanometer housing 11 for aligning the center of gravity of the suspension assembly 10 with the center of buoyancy of the suspension assembly 10. In the present embodiment, this first balancing means takes the form of a pair of externally threaded nonmagnetic metal balancing weights 32 and 33 which are individually adapted to move within a corresponding pair of internally threaded passageways 34 and 35 which extend through the bobbin portion 20a, one near one end and the other near the other end thereof. The center axes of these passageways 34 and 35 are at right angles to one another and to the longitudinal center axis of the body member 20. These passageways 34 and 35 are also spaced equal distances from the longitudinal midpoint of the body member 20. In the present embodiment, the two metal balancing weights 32 and 33 are in the form of hollow brass tubes having square inner and outer cross-sectional shapes, with the exterior corners being rounded off and threaded to enable movement in the passageways 34 and 35. The density of brass weights 32 and 33 is approximately 8.5 grams per cubic centimeter, thus providing a density which is approximately five times greater than that of the perchloroethylene liquid contained in the housing 11.

The suspension assembly 10 also includes second balancing means adjustably mounted in the body member 20 and having a density as nearly equal to the density of the liquid contained in the housing 11 as is practical for simultaneously aligning both the center of gravity and the center of buoyancy of the suspension assembly 10 with the axis of rotation of the suspension assembly 10. In the present embodiment, this second balancing means takes the form of a pair of externally threaded plastic balancing weights 36 and 37 which are individually adapted to move within a corresponding pair of internally threaded passageways 38 and 39 which extend through respective ones of the end pieces 20b and 20c. The center axes of the passageways 38 and 39 are at right angles to one another and to the longitudinal center axis of the body member 20. These passageways 38 and 39 are also spaced equal distances from the longitudinal midpoint of the body member 20. Each of the balancing weights 36 and 37 is formed from a cylinder of plastic material and is provided with a slot cut across one end thereof for enabling screwdriver adjustment of the position of the weight. In the present embodiment, these balancing weights 36 and 37 are composed of a mixture of epoxy resin and a mineral filler in the proper proportions to provide a density which is as nearly equal to the density of the perchloroethylene liquid as is possible at a predetermined reference temperature, preferably, the mean operating temperature.

Each of the metal balancing weights 32 and 33 is also constructed so that its total weight or mass is approximately equal to the total weight or mass of each of the plastic balancing weights 36 and 37. This provides approximately the same adjustment sensitivity for both pairs of balancing weights.

The composition and dimensions of the various elements comprising the suspension assembly 10 are selected and proportioned so that the average specific gravity of suspension assembly 10 as a whole is equal to the specific gravity of the liquid that fills the remainder of the galvanometer housing 11. Realization of this desired equality may be obtained, at least in part, by proper selection of the composition of the liquid.

Balancing of the suspension assembly 10 is obtained by first placing each of the balancing weights 32, 33, 36 and 37 in a central position within its respective passageway. Movement of the metal balancing weights 32 and 33 is obtained by means of a square wrench which is inserted into the square passageway in the center of such weights. The plastic balancing weights 36 and 37, on the other hand, are moved by means of a screwdriver which is placed into engagement with the slots in the ends of such weights.

The desired balance of the suspension assembly 10 is obtained by first adjusting the position of the two metal balancing weights 32 and 33 until the center of gravity of the suspension assembly 10 coincides with the center of buoyancy of such assembly 10. After this condition is obtained, then the plastic balancing weights 36 and 37 are adjusted until the centers of gravity and buoyancy are made to lie on the axis of rotation of the suspension assembly 10. An important feature of this adjustment process is that the fact that the plastic balancing weights 36 and 37 are of the same density as the liquid contained in the galvanometer housing means that adjustment of these plastic balancing weights will effect both the center of gravity and the center of buoyancy in the same manner. Thus, coincidence of these centers of gravity and buoyancy is maintained during the process of shifting the centers to lie on the axis of rotation. This greatly simplifies and facilitates the adjustment process.

A particular manner of performing the balancing process is to first immerse the suspension assembly 10 in a body of the perchloroethylene liquid where the temperature of the liquid is at a predetermined balance value for which the forces of gravity and buoyancy are equal. The metal balancing weights 32 and 33 are then adjusted until no movement of the suspension assembly 10 is observed after the suspension assembly is placed in various different initial positions with respect to the earth's gravitational field. When this condition is obtained, the centers of gravity and buoyancy coincide with one another.

Coincidence of the centers of gravity and buoyancy is not sufficient to provide the desired balance of the suspension assembly 10 under all possible conditions. In particular, when the temperature of the perchloroethylene liquid increases, its density decreases by a factor of 0.125% for each degree centigrade. In such a case, the forces of gravity and buoyancy are no longer equal to one another. As a consequence, a rotational torque may be exerted on the suspension assembly 10 if the resultant force does not pass through the axis of rotation of the suspension assembly and if the axis of rotation is not truly vertical. This torque may lead to a drift of the zero of the galvanometer. This problem is eliminated by the adjustment of the plastic balancing weights.

In order to bring the centers of gravity and buoyancy into alignment with the axis of rotation, the suspension assembly 10 is next suspended in air in a horizontal position. In this case, there is, for all practical purposes, no buoyancy force. The plastic balancing weights 36 and 37 are then adjusted until a condition is obtained such that no subsequent rotation of the suspension assembly 10 is observed for various different initial rotational starting positions. When this occurs, the center of gravity lies on the axis of rotation. This, for the reason mentioned above, also places the center of buoyancy on the axis of rotation.

While there has been described what is at present considered to be a preferred embodiment of this invention, it will be obvious to those skilled in the art that various changes and modifications may be made therein without departing from the invention, and it is, therefore, intended to cover all such changes and modifications as fall within the true spirit and scope of the invention.

What is claimed is:

1. In a galvanometer having a liquid-filled housing and a suspension assembly suspended for rotation therein, an improved suspension assembly comprising:
an elongated body member;
a coil winding mounted on the body member;
first balancing means being non-deformable and adjustably mounted in the body member and having a density at least twice as great as the density of the liquid for aligning the center of gravity of the suspension assembly with the center of buoyancy of the suspension assembly;
and second balancing means adjustably mounted in the body member and having a density approximately equal to the average density of the suspension assembly for simultaneously aligning both the center of gravity and the center of buoyancy of the suspension assembly with the axis of rotation of the suspension assembly.

2. A rotatable suspension assembly for a galvanometer comprising:
an elongated body member having apertures generally transverse to the longitudinal axis thereof;
a galvanometer coil winding supported by said body member;
a first balancing weights being non-deformable and having a density at least twice as great as the density of the suspension assembly and received in some of said apertures for transverse adjustment therein to align the centers of gravity and buoyancy characterizing the suspension assembly;
and second balancing weights having a density approximately the same as the suspension assembly and received within some of said apertures for transverse adjustment therein to enable said suspension assembly centers of gravity and buoyancy to be simultaneously moved equal distances in the same direction for alignment with said longitudinal axis.

3. In a galvanometer having a liquid-filled housing and a suspension assembly suspended for rotation therein, an improved suspension assembly comprising:
an elongated body member;
a coil winding mounted on the body member;
first balancing weights adjustably mounted in the body member and each having a density several times greater than the density of the liquid for aligning the center of gravity of the suspension assembly with the center of buoyancy of the suspension assembly; and
second balancing weights adjustably mounted in the body member and each having a density approximately equal to the density of the liquid for simultaneously aligning both the center of gravity and the center of buoyancy of the suspension assembly with the axis of rotation of the suspension assembly;
all of the balancing weights being individually proportioned to have substantially the same mass.

4. In a galvanometer having a liquid-filled housing and a suspension assembly suspended for rotation therein, an improved suspension assembly comprising:
an elongated body member of plastic material having a middle bobbin portion intermediate a pair of like end pieces;
a coil winding wound on the bobbin portion of the body member;
terminal means located at the two ends of the body member for suspending the body member in the galvanometer housing for enabling rotation therein;
a pair of metal balancing weights each having a density several times greater than the density of the liquid contained in the galvanometer housing and adjustably mounted in the body member, one near one end and the other near the other end thereof, these metal weights being adapted to be moved at right angles to one another and to the longitudinal axis of the body member for aligning the center of gravity of the suspension assembly with the center of buoyancy of the suspension assembly; and
a pair of plastic balancing weights each having a density approximately equal to the density of the liquid contained in the galvanometer housing and adjustably mounted in the body member, one near one end and the other near the other end thereof, these plastic weights being adapted to be moved at right angles to one another and to the longitudinal axis of the body member for simultaneously aligning both the center of gravity and the center of buoyancy of the suspension assembly with the axis of rotation of the suspension assembly.

5. In a galvanometer having a liquid-filled housing and a suspension assembly suspended for rotation therein, an improved suspension assembly comprising:
an elongated body member having a middle bobbin portion intermediate a pair of like end pieces;
a coil winding wound on the bobbin portion of the body member;
terminal means located at the two ends of the body member for suspending the body member in the galvanometer housing for enabling rotation therein;
a first pair of balancing weights each having a density several times greater than the density of the liquid contained in the galvanometer housing and adjustably mounted in the body member, one near one end and the other near the other end thereof, these weights being adapted to be moved at right angles to one another and to the longitudinal axis of the body member for aligning the center of gravity of the suspension assembly with the center of buoyancy of the suspension assembly;
a second pair of balancing weights each having a density approximately equal to the density of the liquid contained in the galvanometer housing and adjustably mounted in the body member, one near one end and the other near the other end thereof, these weights being adapted to be moved at right angles to one another and to the longitudinal axis of the body member for simultaneously aligning both the center of gravity and the center of buoyancy of the suspension assembly with the axis of rotation of the suspension assembly; and
each of the balancing weights being proportioned to have substantially the same mass.

6. In a galvanometer having a liquid-filled housing and a suspension assembly suspended for rotation therein, an improved suspension assembly comprising:
an elongated generally cylindrical and symmetrical body member of plastic material having a middle bobbin portion intermediate a pair of like end pieces;
a coil winding wound on the bobbin portion of the body member;
metal terminal means secured to the two end pieces for suspending the body member in the galvanometer housing for enabling rotation therein;
a pair of metal balancing weights each having a density several times greater than the density of the liquid contained in the galvanometer housing and adjustably mounted in the bobbin portion of the body member, one near one end and the other near the other end thereof at equal distances from the longitudinal midpoint of the body member, these metal weights being adapted to be moved at right angles to one another and to the longitudinal axis of the body member for aligning the center of gravity of the suspension assembly with the center of buoyancy of the suspension assembly;
a pair of plastic balancing weights each having a density approximately equal to the density of the liquid contained in the galvanometer housing and adjustably mounted in different ones of the end pieces at equal distances from the longitudinal midpoint of the body member, these plastic weights being adapted to be moved at right angles to one another and to the longitudinal axis of the body member for simultaneously aligning both the center of gravity and the center of buoyancy of the suspension assembly with the axis of rotation of the suspension assembly;

each of the balancing weights being proportioned to have substantially the same mass; and the average specific gravity of the suspension assembly as a whole being substantially equal to the specific gravity of the liquid contained in the galvanometer housing.

References Cited

UNITED STATES PATENTS 3,161,826  12/1964  Picard _____ 324—97

RUDOLPH V. ROLINEC, *Primary Examiner.*

G. R. STRECKER, *Assistant Examiner.*

U.S. Cl. X.R.

73—430; 324—125